(12) United States Patent
Kaneda et al.

(10) Patent No.: US 10,244,217 B2
(45) Date of Patent: Mar. 26, 2019

(54) PROJECTION DISPLAY UNIT

(71) Applicant: Sony Corporation, Tokyo (JP)

(72) Inventors: Kazumasa Kaneda, Kanagawa (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 15/327,710

(22) PCT Filed: Jun. 12, 2015

(86) PCT No.: PCT/JP2015/066992
§ 371 (c)(1),
(2) Date: Jan. 20, 2017

(87) PCT Pub. No.: WO2016/017296
PCT Pub. Date: Feb. 4, 2016

(65) Prior Publication Data
US 2017/0208305 A1   Jul. 20, 2017

(30) Foreign Application Priority Data

Jul. 29, 2014   (JP) .................................. 2014-153659

(51) Int. Cl.
  G03B 21/14     (2006.01)
  H04N 9/31      (2006.01)
  (Continued)

(52) U.S. Cl.
  CPC ......... H04N 9/3191 (2013.01); G02B 27/283 (2013.01); G03B 21/00 (2013.01);
  (Continued)

(58) Field of Classification Search
  CPC ........ G03B 21/28; G03B 21/14; G03B 21/00; H04N 9/3194; H04N 9/3167; H04N 9/3191; H04N 5/74
  (Continued)

(56) References Cited

U.S. PATENT DOCUMENTS

2007/0263174 A1* 11/2007 Shyu ..................... G03B 21/26
                                                                      353/34
2009/0046253 A1    2/2009 Sunaga
(Continued)

FOREIGN PATENT DOCUMENTS

EP          2120455 A1     11/2009
JP      2003-044839 A       2/2003
(Continued)

OTHER PUBLICATIONS

Extended European Search Report dated Nov. 30, 2017 in connection with European Application No. 15826795.5.
(Continued)

*Primary Examiner* — Ryan D Howard
(74) *Attorney, Agent, or Firm* — Wolf, Greenfield & Sacks, P.C.

(57) ABSTRACT

A projection display unit includes a projection optical system, a polarization separation device, and a detection optical system. The projection optical system includes an illuminator, a projection lens, and a light valve. The light valve modulates illumination light supplied from the illuminator on a basis of an image signal, and outputs the modulated illumination light toward the projection lens. The polarization separation device is disposed between the light valve and the projection lens. The polarization separation device separates entering light into a first polarized component and a second polarized component, and outputs the first polarized component and the second polarized component in respective directions that are different from each other. The detection optical system includes an imaging device. The imaging device is disposed in a position that is optically conjugate to a position of the light valve, and receives, via the projection lens and the polarization separation device, light based on invisible light applied along a plane in vicinity (Continued)

of the projection surface. The following conditional expression (1): $d1<\beta \times d2$ is satisfied.

17 Claims, 13 Drawing Sheets

(51) Int. Cl.
G03B 21/00 (2006.01)
H04N 5/74 (2006.01)
G02B 27/28 (2006.01)
G06F 3/042 (2006.01)

(52) U.S. Cl.
CPC .............. G03B 21/14 (2013.01); H04N 5/74 (2013.01); H04N 9/317 (2013.01); H04N 9/3164 (2013.01); H04N 9/3167 (2013.01); H04N 9/3197 (2013.01); *G06F 3/0425* (2013.01)

(58) Field of Classification Search
USPC .......................................................... 353/20
See application file for complete search history.

(56) References Cited

U.S. PATENT DOCUMENTS

| 2010/0091246 | A1 | 4/2010 | Yamamoto |
| 2016/0021351 | A1* | 1/2016 | Yamagishi ............. G02B 13/16 348/745 |

FOREIGN PATENT DOCUMENTS

| JP | 2004-126997 A | 4/2004 |
| JP | 2007-052218 A | 3/2007 |
| JP | 2008-251725 A | 10/2008 |
| JP | 2012-083871 A | 4/2012 |
| JP | 2013-120586 A | 6/2013 |
| JP | 2015-064550 A | 4/2015 |
| WO | WO 2014/141718 A1 | 9/2014 |
| WO | WO 2015-029365 A1 | 3/2015 |

OTHER PUBLICATIONS

Communication Pursuant to Article 94(3) issued Jun. 22, 2018 in connection with European Application No. 15826795.5.

* cited by examiner

[FIG. 1]
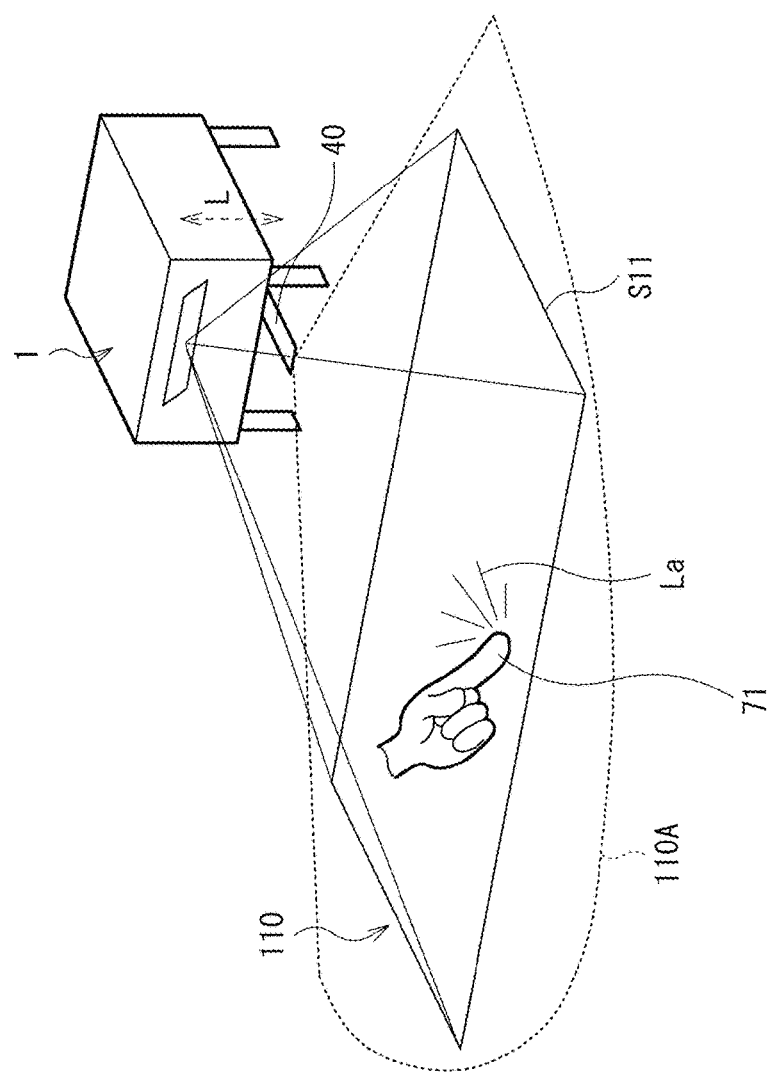

[FIG. 2]
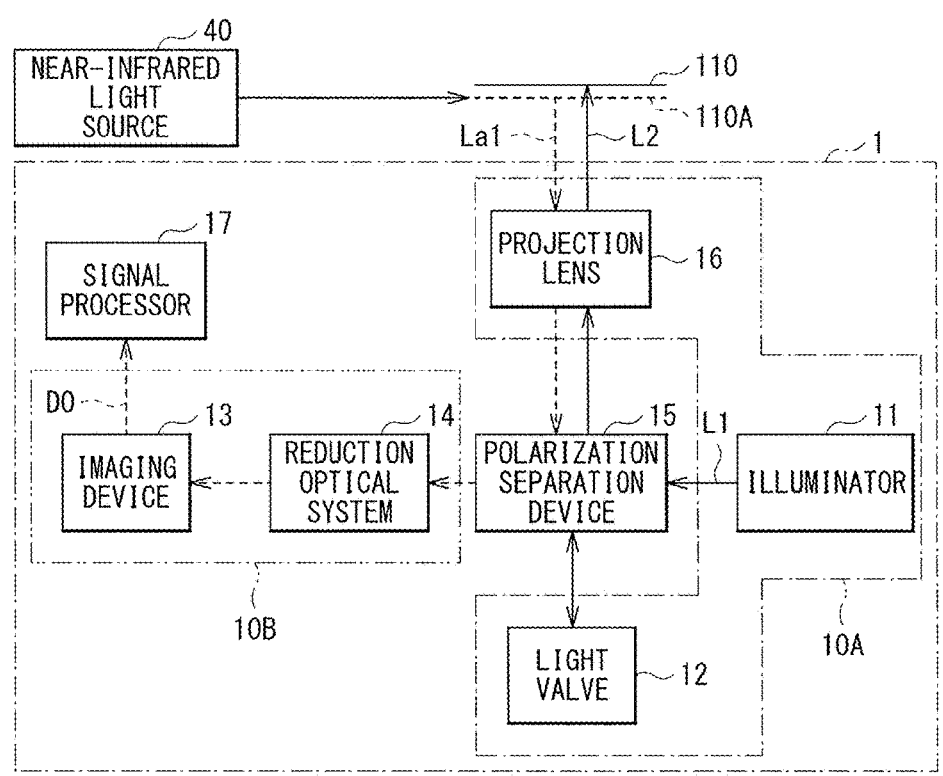

[FIG. 3]
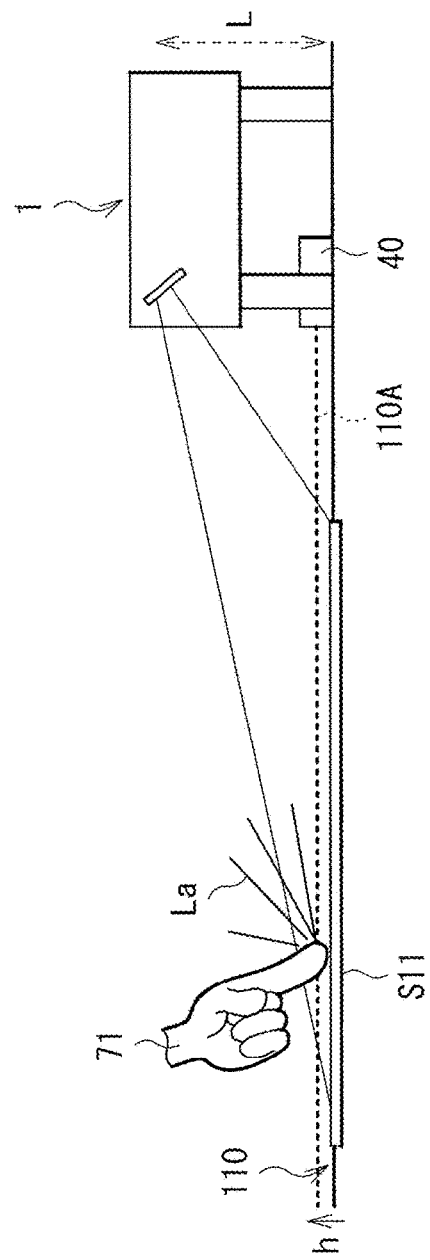

[ FIG. 4 ]
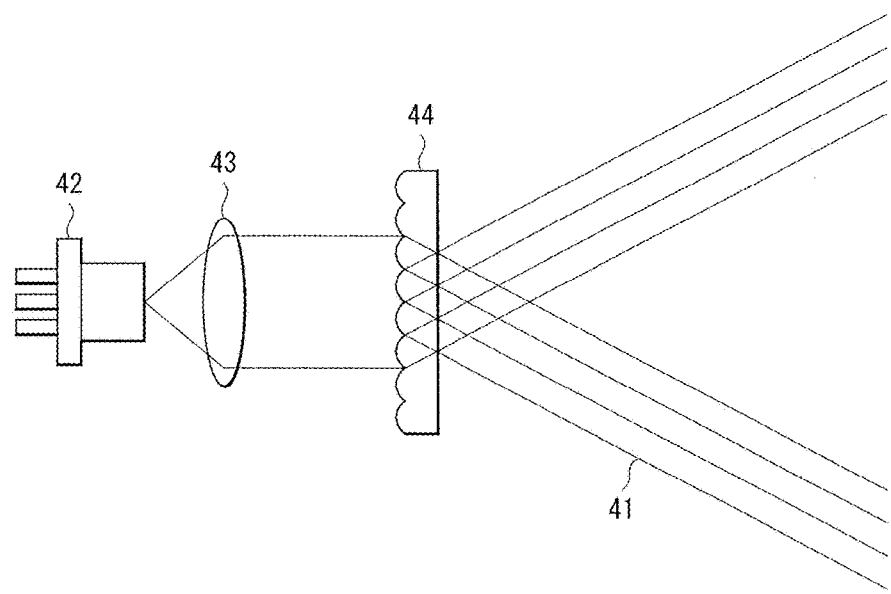
[ FIG. 5A ]
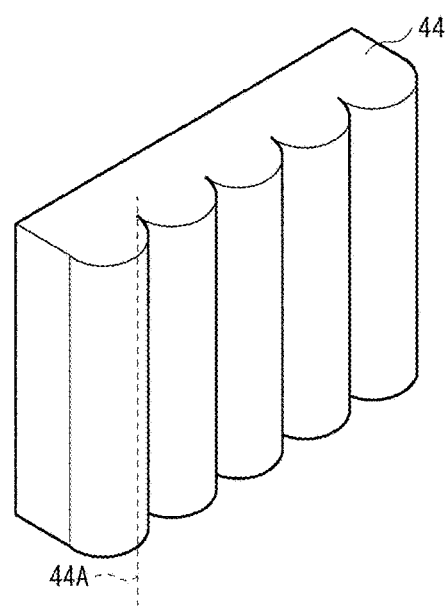

[ FIG. 5B ]
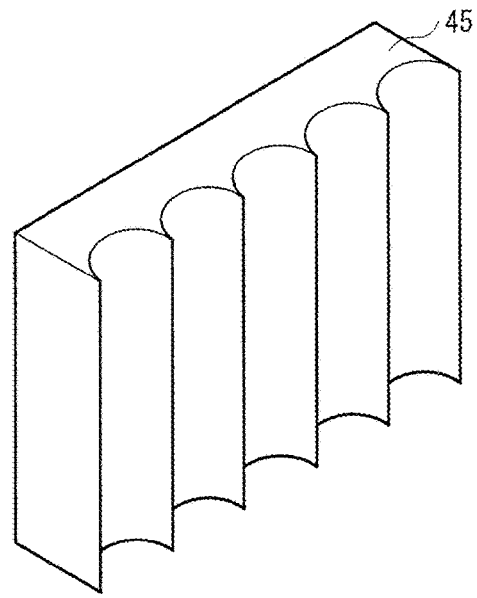
[ FIG. 6 ]
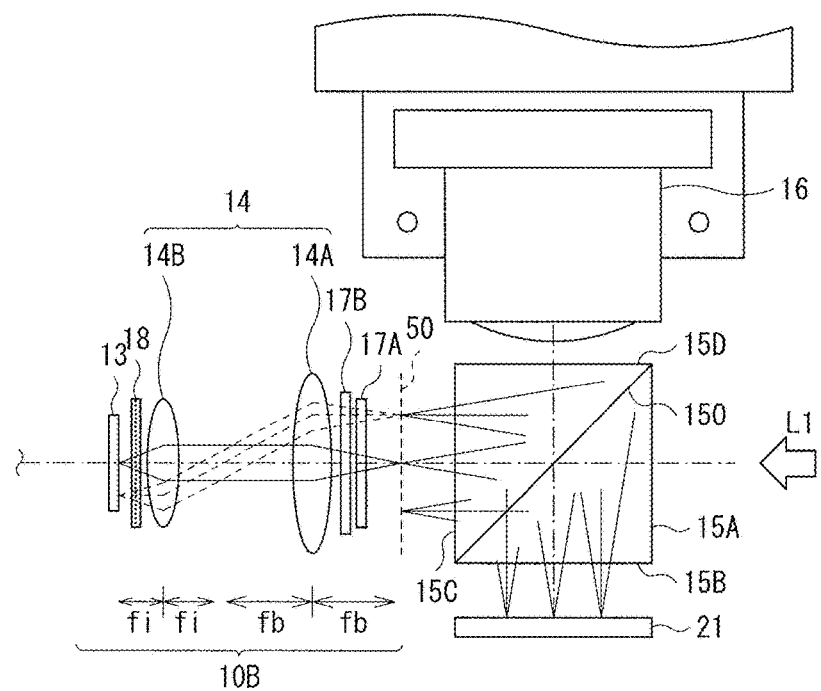

[ FIG. 7 ]
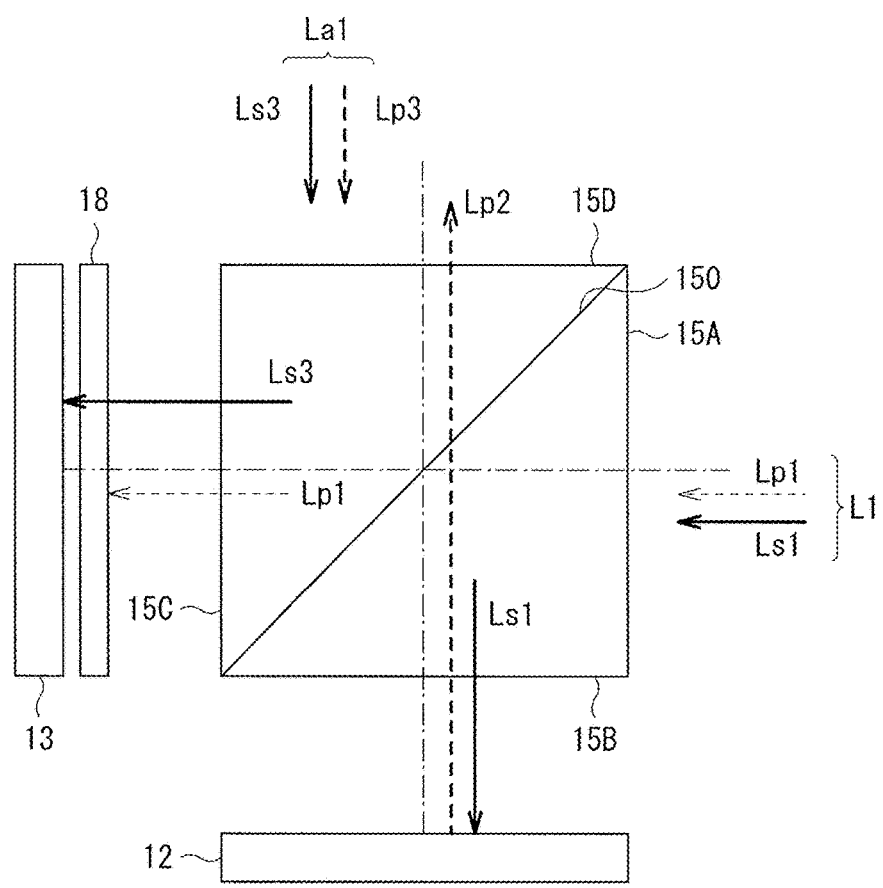

[ FIG. 8A ]
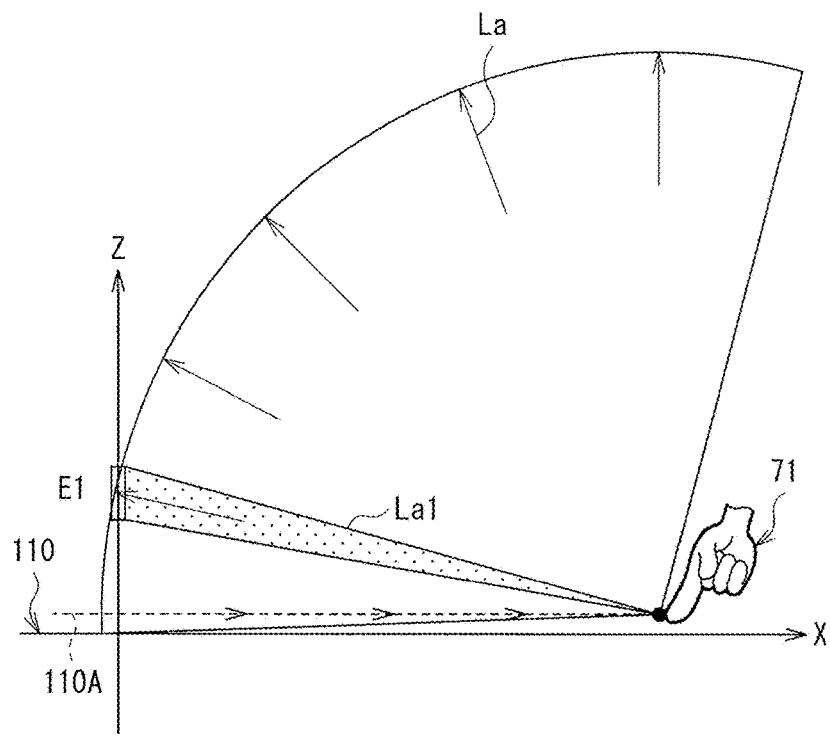
[ FIG. 8B ]
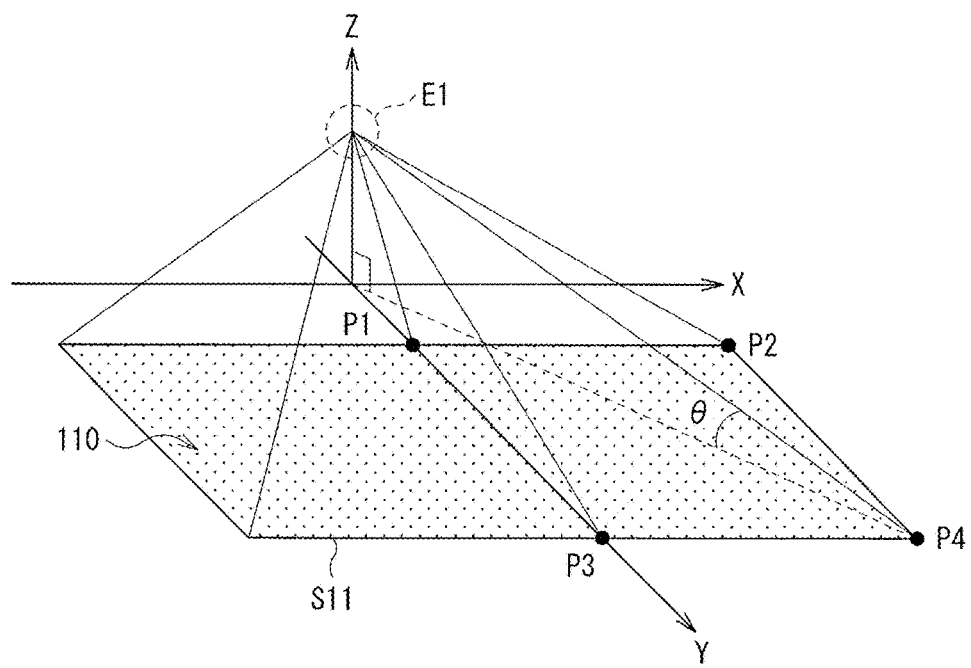

[ FIG. 8C ]
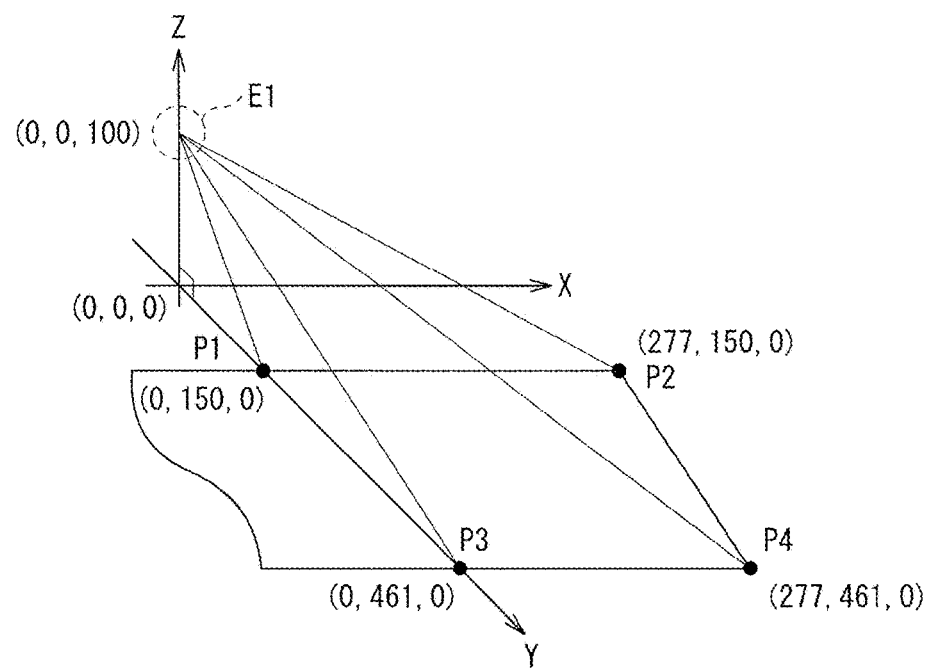
[ FIG. 9 ]
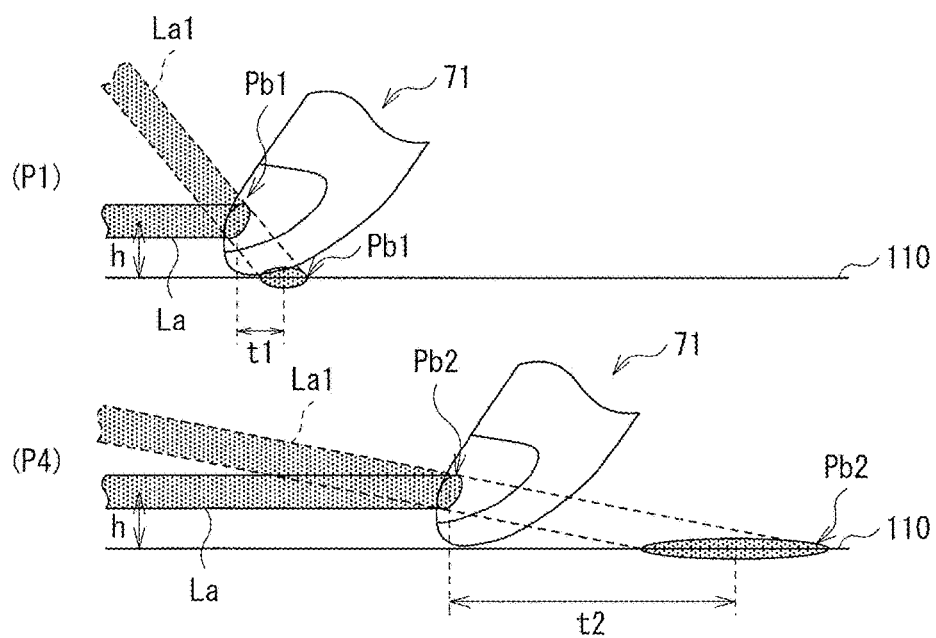

[ FIG. 10 ]
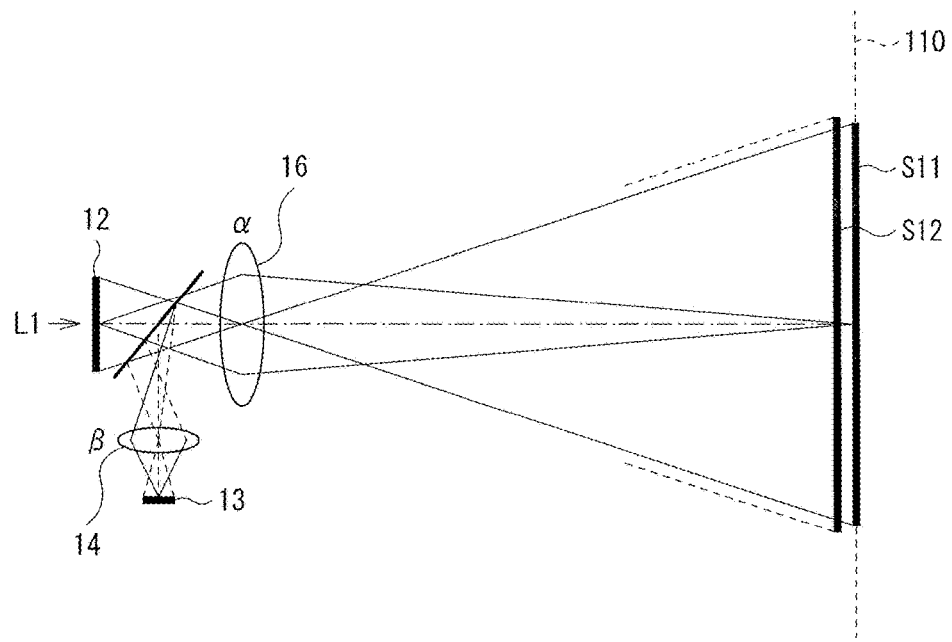

[ FIG. 11 ]
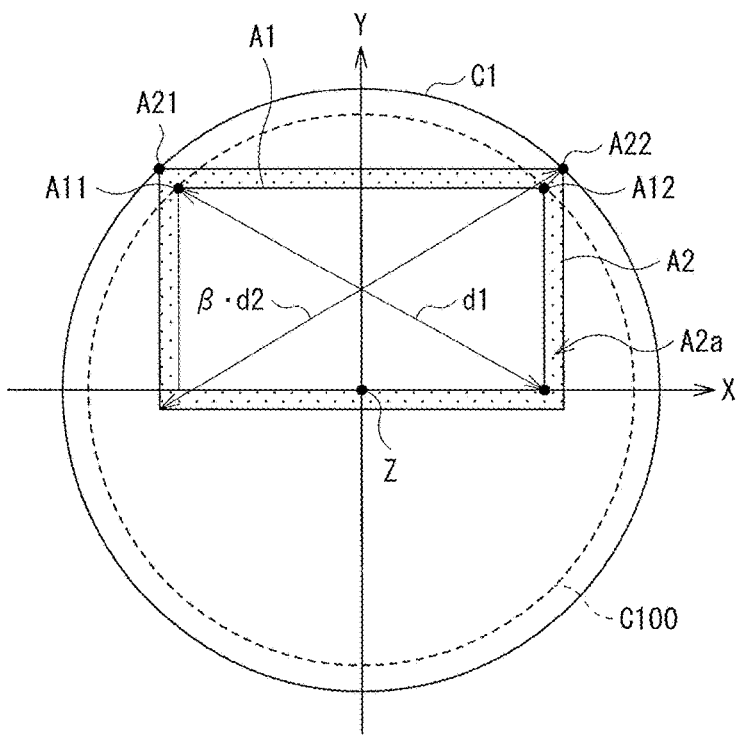
[ FIG. 12 ]
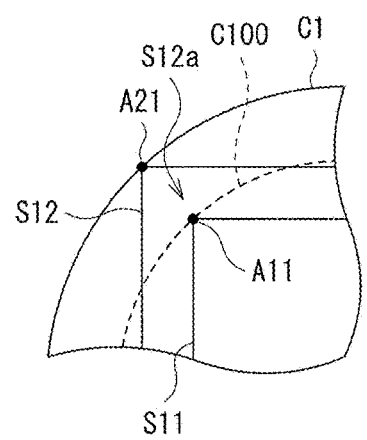

[ FIG. 13 ]
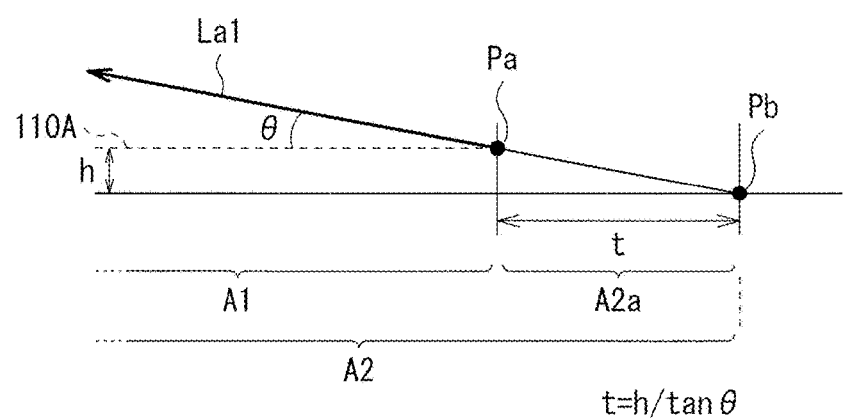

[ FIG. 14 ]
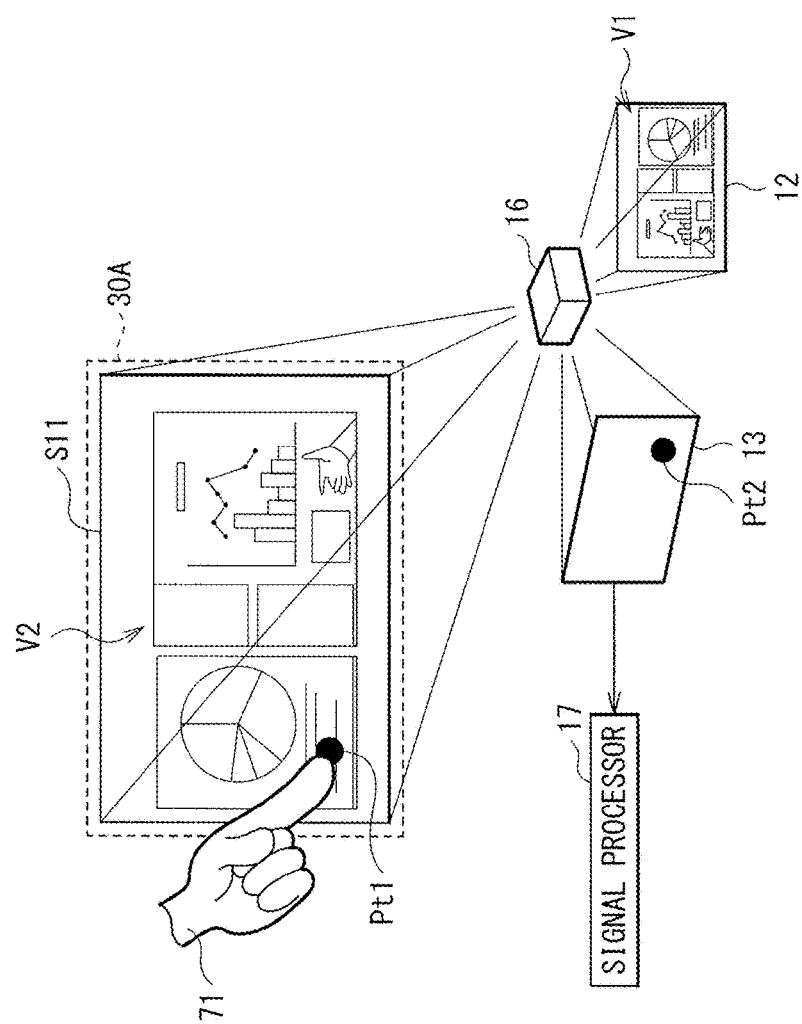

[ FIG. 15A ]
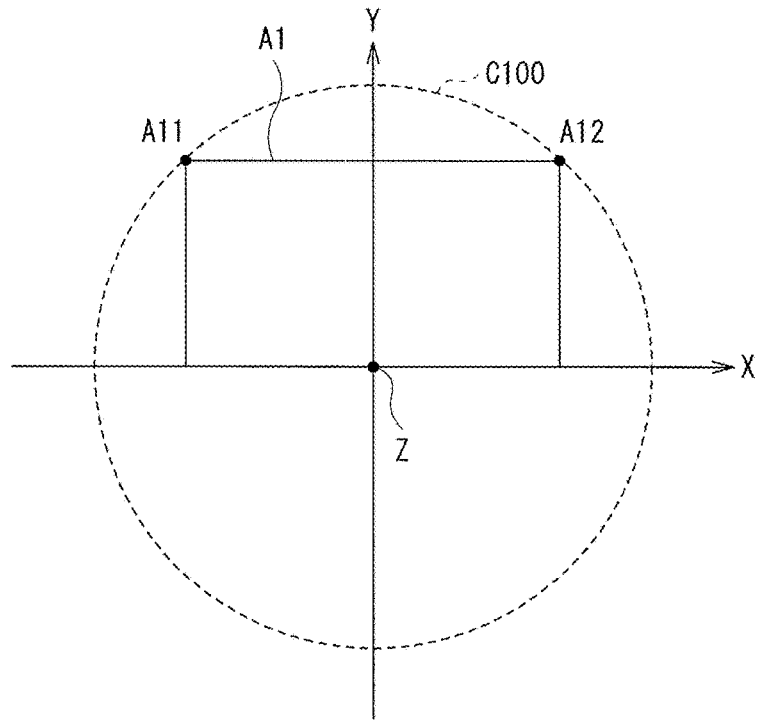
[ FIG. 15B ]
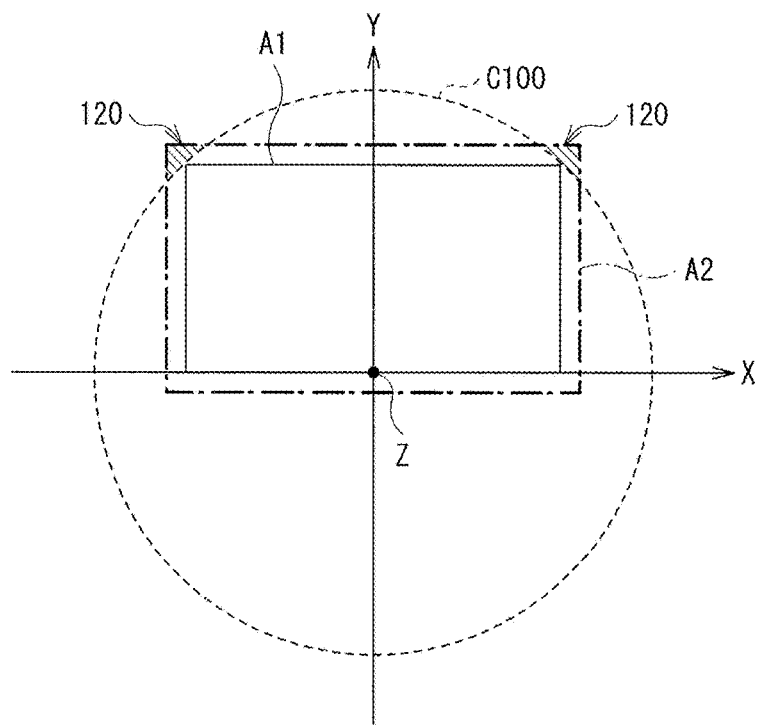

PROJECTION DISPLAY UNIT

CROSS REFERENCE TO RELATED APPLICATIONS

This is a U.S. National Stage Application under 35 U.S.C. § 371, based on International Application No. PCT/JP2015/066992, filed Jun. 12, 2015, which claims priority to Japanese Patent Application JP 2014-153659, filed Jun. 29, 2014, each of which is hereby incorporated by reference in its entirety.

TECHNICAL FIELD

The disclosure relates to a projection display unit having a detection function.

BACKGROUND ART

In recent years, for example, a smartphone or a tablet terminal may include a touch panel, thereby allowing, for example, page-turning, zooming-in, or zooming-out of an image displayed on a screen to be performed by an intuitive pointing operation. On the other hand, as a display unit that performs display by projecting an image onto a screen, a projector (a projection display unit) has been long known. There is proposed a technique to add a detection function such as that of a touch panel to the projector, for example, as disclosed in PTLs 1 and 2.

CITATION LIST

Patent Literature

PTL 1: Japanese Unexamined Patent Application Publication No. 2007-52218
PTL 2: Japanese Unexamined Patent Application Publication No. 2003-44839

SUMMARY OF INVENTION

In a projector described in PTL 1, image projection by a projection optical system and taking-in of detection light by a detection optical system are performed with a single projection lens. Further, a light valve that produces an image and an imaging device that receives the detection light are disposed in positions that are optically conjugate to each other. Such a unit configuration allows for accurate object detection without performing a complicated process such as calibration. An interactive device is achievable with a simple configuration.

However, the foregoing configuration described in PTL 1 may not secure a sufficient detection region (a sufficient detectable region, or a sufficient detection range) on a projection surface, and may have a room for further improvement. What is desired is to achieve a unit that is able to perform object detection in substantially the entire projection region.

Accordingly, it is desirable to provide a projection display unit that achieves object detection with a simple configuration and is able to detect an object in substantially the entire projection region.

A projection display unit according to one embodiment of the disclosure includes a projection optical system, a polarization separation device, and an imaging device. The projection optical system includes an illuminator, a projection lens, and a light valve. The light valve modulates illumination light supplied from the illuminator on a basis of an image signal, and outputs the modulated illumination light toward the projection lens. The polarization separation device is disposed between the light valve and the projection lens. The polarization separation device separates entering light into a first polarized component and a second polarized component, and outputs the first polarized component and the second polarized component in respective directions that are different from each other. The imaging device is disposed in a position that is optically conjugate to a position of the light valve, and receives, via the projection lens and the polarization separation device, light based on invisible light applied along a plane in vicinity of the projection surface. The following conditional expression is satisfied, $$d1 < \beta \times d2 \qquad (1)$$

where d1 is a diagonal size of the light valve, db is a diagonal size of the imaging device, and β is an optical magnification, of the detection optical system. β is greater than 1 when the detection optical system is a reduction optical system, is smaller than 1 when the detection optical system is an enlargement optical system, and is equal to 1 when the detection optical system is an equal magnification optical system.

It is to be noted that a "diagonal size" used herein may refer to a length of a diagonal line of any of an effective region (a drawing region, or an effective display region) of the light valve and an effective region (an effective imaging region) of the imaging device.

In the projection display unit according to one embodiment of the disclosure, an imaging device is disposed in a position that is optically conjugate to a position of a light valve, and the imaging device receives, via a projection lens and a polarization separation device, light based on invisible light applied along a plane in the vicinity of a projection surface, i.e., part of invisible light reflected by an object. This allows for detection of the object associating a position in a projection region and a position in a detection region, without performing a complicated signal process such as calibration. Further, the conditional expression (1) is satisfied. This allows for object detection to be performed in substantially the entire projection region.

According to the projection display unit according to one embodiment of the disclosure, disposing the imaging device in the position that is optically conjugate to the position of the light valve and reception, by the imaging device, via the projection lens and the polarization separation device, of the light based on the invisible light applied along the plane in the vicinity of the projection surface make it possible to perform the object detection without performing a complicated signal process. Further, the configuration satisfying the conditional expression (1) makes it possible to perform the object detection in substantially the entire projection region. As a result, it is possible to achieve object detection with a simple configuration and to detect an object in the entire projection region.

It is to be noted that the above description is mere example of the disclosure. Effects of the disclosure are not limited to effects described above, and may be different from the effects described above, or may further include any other effect.

BRIEF DESCRIPTION OF DRAWINGS

FIG. 1 schematically illustrates an appearance and a usage state of a projection display unit according to one embodiment of the disclosure.

FIG. 2 is a block diagram illustrating a functional configuration of the projection display unit illustrated in FIG. 1.

FIG. 3 is a schematic side view of the state illustrated in FIG. 1.

FIG. 4 illustrates a configuration example of a near-infrared light source illustrated in FIG. 1.

FIG. 5A is a perspective view of a first configuration example of a cylinder array lens.

FIG. 5B is a perspective view of a second configuration example of the cylinder array lens.

FIG. 6 illustrates a configuration of a key part of the projection display unit illustrated in FIG. 1.

FIG. 7 schematically illustrates a configuration example of a polarization separation device together with states of entering light and output light.

FIG. 8A schematically illustrates a concept of taking-in of detection light.

FIG. 8B schematically describes a difference in take-in angle between detection positions.

FIG. 8C schematically illustrates an example of detection position coordinates.

FIG. 9 schematically describes a difference between a reflection point and a virtual light emission point of the detection light.

FIG. 10 describes a diagonal size of an imaging device.

FIG. 11 schematically illustrates an image circle of a projection lens together with a light valve size and an imaging device size.

FIG. 12 is an enlarged view of part of FIG. 11.

FIG. 13 schematically describes detailed conditions for the image circle.

FIG. 14 schematically illustrates a concept of image display and object detection of the projection display unit illustrated in FIG. 1.

FIG. 15A schematically illustrates an image circle of a projection lens according to a comparative example.

FIG. 15B schematically illustrates the image circle of the projection lens according to the comparative example together with an imaging device size.

MODES FOR CARRYING OUT THE INVENTION

Some embodiments of the disclosure are described in detail below referring to the accompanying drawings. It is to be noted that the description is given in the following order.

Embodiment (An example of a projection display unit in which a diagonal size of an imaging device is so set to satisfy a predetermined conditional expression and a radius of an image circle provided by a projection lens is optimized)
1. Configuration
2. Workings and Effects

Embodiment

[Configuration]

FIG. 1 illustrates an appearance and a usage state of a projection display unit (a projection display unit 1) according to one embodiment of the disclosure. FIG. 2 illustrates a functional configuration of the projection display unit 1. The projection display unit 1 may be, for example, a projector of a type (a so-called ultra-short throw type) that projects an image onto the vicinity of its own while being placed on a flat surface such as a top of a table (or while being mounted on, for example, a wall surface). The projection display unit 1 may also have a function of actively performing object detection in addition to the image display function. As illustrated in FIG. 1, a predetermined input operation is allowed to be performed by performing an operation in a way such as touching a displayed image with a finger (an indicator 71) in a projection region (a projection region S11) onto which an image is projected, as will be described in detail later.

Referring to FIG. 2, the projection display unit 1 may include an illuminator 11, a light valve 12, an imaging device 13, a reduction optical system 14, a polarization separation device 15, a projection lens 16, and a signal processor 17. Out of the foregoing members, for example, the illuminator 11, the light valve 12, and the projection lens 16 may configure a projection optical system 10A. Further, for example, the imaging device 13 and the reduction optical system 14 may configure a detection optical system 10B. It is to be noted that, for example, driving of the illuminator 11, the light valve 12, the imaging device 13, and the signal processor 17 may be controlled by an unillustrated system controller at predetermined timings.

The projection display unit 1 may include a casing provided with a near-infrared light source 40. The near-infrared light source 40 may output near-infrared (NIR) light as invisible light for detection, and apply the near-infrared light along a plane in the vicinity of a projection surface 110. In other words, the near-infrared light source 40 may so provide, in the vicinity of the projection surface 110, a barrier of the near-infrared light (a detection light plane 110A) that the barrier of the near-infrared light (the detection light plane 110A) covers the projection region S11. Referring to FIG. 3, the detection light plane 110A may be provided in a plane at a predetermined height "h" from the projection surface 110. The predetermined height "h" may be different from a height of an optical axis that passes through the projection lens 16.

To give an example, the detection light plane 110A may be provided, for example, with a thickness (a width in a height direction) from 2 mm to 3 mm in a position at the height "h" of about several millimeters to about several tens of millimeters. Further, the detection light plane 110A may cover the projection region S11 in an in-plane direction. In general, the projection surface 110 is flat. Therefore, in the absence of any blocking object or the indicator 71 such as a finger and a pointer, the detection light plane 110A is not blocked. In other words, the imaging device 13 monitoring the projection surface 110 may capture nothing. In this state, when the indicator 71 is brought near the projection surface 110, or when the indicator 71 performs an operation such as touching the projection surface 110, the near-infrared light of the detection light plane 110A may be blocked by the indicator 71, and be thereby reflected and diffused at a point where the near-infrared light of the detection light plane 110A is blocked. The light that reaches the indicator 71 and is reflected by the indicator 71 may travel in various directions. However, part of the reflected light may be taken in by an aperture of the projection lens 16. The part taken in of the reflected light may reach the imaging device 13 via the projection lens 16 and the polarization separation device 15. At this time, bright spot diffusion points each occurring in a dot shape on the projection surface 110 may be focused onto the imaging device 13, and be focused in a position corresponding to a position in the projected image. One reason for this is that the light valve 12 providing an image and the imaging device 13 are disposed in positions that are optically conjugate to each other. This allows for detection of a position of an object. Moreover, the ultra-short throw type may be advantageous in visibility of a screen upon performing of an operation. One reason for this is that projection light of the ultra-short throw type travels the vicinity of the projection surface 110, which is more difficult to be blocked by part of a body of a person who performs an operation.

It is to be noted that the near-infrared light source 40 may be provided, for example, at a lower part of the casing of the projection display unit 1 as illustrated; however, the near-infrared light source 40 may be disposed adjacent to the projection display unit 1 or may not be disposed adjacent to the projection display unit 1. The near-infrared light source 40 may be disposed in a position away from the projection display unit 1 as long as the detection light plane 110A is so provided as to cover the projection region S11. Alternatively, the near-infrared light source 40 may be disposed inside the casing (an enclosure) of the projection display unit 1. In the present embodiment, the near-infrared light source 40 is allowed to be disposed at a height relatively away from the projection surface 110 due to optical design that will be described later. This makes it easier to bundle the near-infrared light source 40 integrally with the projection display unit 1.

The foregoing detection light plane 110A may achieve a mechanism in which, when an object (the indicator 71) is brought into contact with or brought near the projection surface 110A, the near-infrared light is reflected (reflected and diffused) by the indicator 71, and part of the reflected light is taken in by the projection display unit 1 as the detection light.

Referring to FIG. 4, the near-infrared light source 40 may include a near-infrared laser 42, a collimator lens 43, and a cylinder array lens 44, for example. Near-infrared light 41 outputted from the cylinder array lens 44 may provide the detection light plane 110A. Referring to FIG. 5A, the cylinder array lens 44 may include an array of a plurality of convex cylinder lenses. The cylinder array lens 44 may be so disposed that a generatrix 44A of each of the cylinder lenses faces a plane perpendicular to the projection surface 110. It is to be noted that, instead of the convex cylinder array lens 44, a cylinder array lens 45 including an array of a plurality of concave cylinder lenses as illustrated in FIG. 5B may be used.

The illuminator 11 may output illumination light toward the light valve 12 via the polarization separation device 15. The illuminator 11 is not specifically limited as long as the illuminator 11 outputs visible light as the illumination light L1. For example, the illuminator 11 may include an unillustrated blue laser, an unillustrated green laser, and an unillustrated red laser.

Referring to FIG. 2 and FIGS. 6 to 13, a configuration of a key part of the projection display unit 1 is described below.
(Projection Optical System 10A)

The light valve 12 may be a reflective liquid crystal device such as liquid crystal on silicon (LCOS), for example. The light valve 12 may modulate a first polarized component (for example, an s-polarized component Ls1 described later) included in the illumination light L1, on the basis of image data, for example. A polarization state of the light modulated by the light valve 12 may be rotated to be converted into a second polarized component (for example, a p-polarized component Lp1 described later). This modulated light is outputted toward the projection lens 16 via the polarization separation device 15. It is to be noted that the light valve 12 may allow for black display by returning entering light (the s-polarized component Ls1) to the polarization separation device 15 without changing the polarization state thereof. A planar shape of an effective region of the light valve 12 may be rectangular, for example.

The projection lens 16 may project, onto the projection surface 110, light (image light L2) having entered from the light valve 12 via the polarization separation device 15. The projection lens 16 may be an ultra-short throw lens with a throw ratio of 0.38 or smaller, for example. It is to be noted that the throw ratio is expressed by L/H, where L is a distance from the projection lens 16 to the projection surface 110, and H is a width of the projection region S11. Referring to FIGS. 2 and 6, the projection lens 16 may receive the detection light (near-infrared light La1) from a direction opposite to a traveling direction of the modulated light. In the present embodiment, the detection light may be taken in via the projection lens 16 of the projection optical system 10A to be guided to the detection optical system 10B in the foregoing manner. Moreover, a radius of an image circle provided by the projection lens 16 may be set with a reference not of a size of the light valve 12 but of a size of the imaging device 13, which will be described later in detail.
(Polarization Separation Device 15)

The polarization separation device 15 separates entering light into the first polarized component (for example, the s-polarized component) and the second polarized component (for example, the p-polarized component), and outputs the first polarized component and the second polarized component in respective directions that are different from each other. The polarization separation device 15 may include a polarizing beam splitter (PBS), for example. The polarization separation device 15 may selectively reflect the first polarized component (reflect the first polarized component by a polarization separation surface 150) and allow the second polarized component to selectively pass therethrough (pass through the polarization separation surface 150). The present embodiment is described referring to an example case in which the polarizing beam splitter is used as the polarization separation device 15. However, the polarization separation device 15 is not limited to the polarizing beam splitter, and may include a wire grid. In this case, the wire grid has different characteristics from those of the polarizing beam splitter, therefore selectively reflecting the p-polarized component as the first polarized component of entering light and allowing the s-polarized component as the second polarized component to selectively pass therethrough.

Referring to FIG. 6, the polarization separation device 15 may have four optical surfaces (a first surface 15A, a second surface 15B, a third surface 15C, and a fourth surface 15D) and the polarization separation surface 150, for example. The first surface 15A and the third surface 15C may face each other in a uniaxial direction (a right-left direction in the diagram), and the second surface 15B and the fourth surface 15D may face each other in a uniaxial direction (a top-bottom direction in the diagram). In such a configuration, the first surface 15A may receive the illumination light L1, and the second surface 15B may face the light valve 12. The third surface 15C may face the detection optical system 10B. The fourth surface 15D may face the projection lens 16.

FIG. 7 illustrates a configuration example of the polarization separation device 15. As illustrated, the polarization separation device 15 may reflect the first polarized component (the s-polarized component Ls1) out of the illumination light L1 having entered the polarization separation device 15 from the first surface 15A to be outputted from the second surface 15B. Meanwhile, the polarization separation device 15 may output, from the third surface 15C, the second polarized component (the p-polarized component Lp1) out of the illumination light L1. Further, the polarization separation device 15 may output, from the fourth surface 15D, the second polarized component (a p-polarized component Lp2) out of light having entered the polarization separation device 15 from the second surface 15B (the light modulated by the light valve 12). This may allow for image projection by the projection optical system 10A. Meanwhile, the polarization separation device 15 may reflect the first polarized component (an s-polarized component Ls3) out of light (the near-infrared light La1) having entered the polarization separation device 15 from the fourth surface 15D to be outputted from the third surface 15C. Light based on the foregoing s-polarized component Ls3 may be received by the imaging device 13. Thus, an imaging signal D0 may be obtained by the imaging device 13.

(Detection Optical System 10B)

The imaging device 13 is disposed in a position that is optically conjugate to a position of the light valve 12. More specifically, when the light valve 12 is a reflective liquid crystal device, the imaging device 13 may be so disposed that a display surface (a liquid crystal surface) where an image is produced and an imaging surface of the imaging device 13 are in a relationship optically conjugate to each other. The imaging device 13 may include a solid-state imaging device such as a complementary metal-oxide semiconductor (CMOS) and a charge coupled device (CCD). A planar shape of an effective region of the imaging device 13 may be rectangular, for example. In the present embodiment, the diagonal size of the imaging device 13 may be so designed as to satisfy a predetermined conditional expression, which will be described later in detail.

Referring to FIG. 6, an example of the detection optical system 10B including the foregoing imaging device 13 may include a visible light cut filter 17A, a bandpass filter 17B, the reduction optical system 14 (relay lens groups 14A and 14B), a polarizer 18, and the imaging device 13 that are disposed in order from a conjugate plane 50 side, for example.

The visible light cut filter 17A may reduce a visible light component of entering light. Provision of the visible light cut filter 17A makes it possible to cut a large quantity of the illumination light L1 to enter the imaging device 13 without turning off a light source of the illuminator 11, also when the polarizing beam splitter is used as the polarization separation device 15. This may allow nearly only the detection light to enter the imaging device 13 side, increasing an S/N ratio to improve detection accuracy. It is to be noted that one visible light cut filter 17A may be provided in this example; however, the number of the visible light cut filter is not limited to one, and may be two or more. Moreover, the visible light cut filter 17A may be disposed in a position between the conjugate plane 50 and the reduction optical system 14 in this example; however, the visible light cut filter 17A may be disposed in another position, for example, in a position between the reduction optical system 14 and the imaging device 13.

The bandpass filter 17B may allow a specific wavelength (near-infrared light) to selectively pass therethrough and reduce other wavelengths.

The polarizer 18 may be an optical member that reduces the second polarized component included in the illumination light L1. In this example, the polarization separation device 15 as described above may allow the second polarized component (for example, the p-polarized component) out of the illumination light L1 to pass therethrough, allowing the p-polarized component to enter the detection optical system 10B. This may influence an S/N ratio of the imaging signal obtained in the imaging device 13. Provision of the polarizer 18 as in the present embodiment may cut the second polarized component (for example, the p-polarized component) included in the illumination light L1, thereby increasing the S/N ratio. It is to be noted that the position of the polarizer 18 is not limited to the illustrated position between the reduction optical system 14 and the imaging device 13. The polarizer 18 may be disposed in another position, for example, a position between the conjugate plane 50 and the reduction optical system 14.

The reduction optical system 14 may include one or a plurality of relay lens groups (two relay lens groups 14A and 14B, in this example). Each of the relay lens groups 14A and 14B may have positive power, and include at least one lens. A focal length fi of the relay lens group 14B may be so set as to be smaller than a focal length fb of the relay lens group 14A. For example, on condition that 2fi is equal to fb (2fi=fb), the relay lens group 14A may be disposed in a position away from the conjugate plane 50 of the light valve 12 by the focal length fb, the relay lens group 14B may be disposed in a position away from the foregoing position of the relay lens group 14A by (fb+fi), and the imaging device 13 may be disposed in a position away from the relay lens group 14B by the focal length fi. Such an arrangement of the relay lens groups 14A and 14B may be equivalent to a case where the imaging device 13 is disposed on the conjugate plane 50 while achieving a reduction optical system. In other words, it is possible to reduce the size of the imaging device 13 while maintaining a positional relationship conjugate to the light valve 12. It is to be noted that the present embodiment is described referring to an example case where the detection optical system 10B includes the reduction optical system 14. However, the reduction optical system 14 may not be provided. Specifically, the detection optical system 10B may include an enlargement optical system or an equal magnification optical system.

Object detection by means of the foregoing reduction optical system 10B may be advantageous to cost reduction. The cost of the imaging device 13 may be greatly influenced by the size of the imaging device 13. Cost of configuring the projector is weighted heavily toward the light valve 12 and the imaging device 13 as semiconductor components. Therefore, a size reduction in such components may be advantageous in terms of cost. Moreover, object detection by means of the foregoing reduction optical system may be advantageous due to increased flexibility of arrangement attributed to extension of a conjugate point by a relay optical system. For example, spacing between components may be provided, allowing for a bending optical system by providing a reflective mirror in the spacing.

According to the present embodiment, the diagonal size of the imaging device 13 in the foregoing detection optical system 10B satisfies the following conditional expression (1), where d1 is a diagonal size of the light valve 12, d2 is the diagonal size of the imaging device 13, and β is an optical magnification, of the detection optical system. β is greater than 1 when the detection optical system is a reduction optical system, is smaller than 1 when the detection optical system is an enlargement optical system, and is equal to 1 when the detection optical system is an equal magnification optical system. It is to be noted that, in the present embodiment with the detection optical system 10B including a reduction optical system, β is a reduction magnification of the reduction optical system 14, which is greater than 1(β>1). It is to be also noted that the diagonal size d1 may be a diagonal size of the effective region of the light valve 12, and the diagonal size d2 may be a diagonal size of the effective region of the imaging device 13.

$$d1 < \beta \times d2 \tag{1}$$

A basis of derivation of the foregoing conditional expression (1) is described below with reference to FIGS. 8A to 11.

First, an outline of taking-in of the detection light is described. As schematically illustrated in FIG. 8A, when the indicator 71 such as a finger is brought into contact with the projection surface 110 or is brought near the projection surface 110, the near-infrared light La of the detection light plane 110A provided in the vicinity of the projection surface 110 may reach the indicator 71 and be reflected and diffused in various directions. Part (the near-infrared light La1) of the reflected and diffused light (scattered light) may be collected by the projection lens 16, and the collected light may be taken in by an exit pupil E1 of the detection optical system 10B.

A detailed description is given below of the near-infrared light La1 to be taken in by the detection optical system 10B via the projection lens 16 as described above. Referring to FIG. 8B, upon detection of a position of an object on the projection surface 110, a take-in angle of the near-infrared light La1 (an angle θ formed by the projection surface 110 and the near-infrared light La1 to enter the exit pupil E1 of the detection optical system 10B) may differ depending on the detection position. Specifically, the exit pupil E1 may be in a position in an upper direction when seen from a position P1 that is nearest to the exit pupil E1. The take-in angle θ may be therefore the largest in the position P1. Further, the take-in angle θ may gradually decrease in positions P2 and P3 in order, which are farther from the exit pupil E1 in order. The take-in angle θ may be the smallest in a position P4 which is farthest from the exit pupil E1.

FIG. 8C and the following Tables 1 to 3 describe an example. Table 1 describes projection conditions. It is to be noted that the exit pupil E1 may be provided at a height of 100 mm from the projection surface 100 such as a screen and a floor. FIG. 8C describes a position coordinate (X, Y, Z) of each of the positions P1 to P4 in the projection region S11 provided on the foregoing projection conditions. Further, Table 2 describes a distance to the exit pupil E1 together with the position coordinate (X, Y, Z) of each of the positions P1 to P4. Further, Table 3 describes an angle (the take-in angle θ) formed by the projection surface 110 and the exit pupil E1 in each of the positions P1 to P4. As can be appreciated, the take-in angle θ may vary depending on the distance from the exit pupil E1. The take-in angle θ is the greatest (θ=33.7°) in the position P1, and is the smallest (θ=10.5°) in the position P4. Further, the take-in angle θ is 17.6° in the position P2, and is 12.2° in the position P3.

TABLE 1

| Projection condition | |
| --- | --- |
| Projection size | 25 inches |
| Aspect ratio | 16:9 |
| Diagonal size | 635 mm |
| Horizontal size | 553 mm |
| Vertical size | 311 mm |

TABLE 2

| Distance to exit pupil (mm) | | | | |
| --- | --- | --- | --- | --- |
| Detection position | X | Y | Z | Distance |
| P1 | 0 | 150 | 100 | 180 |
| P2 | 277 | 150 | 100 | 330 |
| P3 | 0 | 461 | 100 | 472 |
| P4 | 277 | 461 | 100 | 547 |

TABLE 3

| Angle θ (°) formed with exit pupil | |
| --- | --- |
| P1 | 33.7 |
| P2 | 17.6 |
| P3 | 12.2 |
| P4 | 10.5 |

As can be appreciated from above, the distance to the exit pupil E1 and the take-in angle θ may vary depending on the detection position. Values of the foregoing respective parameters themselves may differ depending on, for example, the size of the projection region S11, or ultra-short throw type lens design. However, the relative relationship in magnitude of the take-in angle θ depending on the detection position described above does not vary. This relationship is therefore utilized to identify the position of the indicator 71.

Next, the near-infrared light La1 to enter the exit pupil E1 is considered in more detail. FIG. 9 schematically illustrates a state of reflection near the indicator 71. It is to be noted that an upper diagram illustrates reflection in the position P1, and a lower diagram illustrates reflection in the position P4. As illustrated in FIG. 9, the near-infrared light La of the detection light plane 110 may reach the indicator 71 and be reflected by the indicator 71. At this time, the following phenomenon may occur. That is, in the present embodiment, from a view point of the exit pupil E1 (the projection lens 16), the near-infrared light La1 may be seen as if light is emitted from points (virtual light emission points Pb1 and Pb2) on the projection surface 110 that are located farther, by an oblique component of the height "h", than reflection points (actual application points) Pa1 and Pa2 at which the near-infrared light actually reaches the indicator 71. In other words, a difference t1 may be present between the reflection point Pa1 corresponding to the actual position of the indicator 71 and the virtual light emission point Pb1. Similarly, a difference t2 may be present between the reflection point Pa2 and the virtual light emission point Pb2. Further, these differences (elongated amounts of the detection positions) may each be influenced by the detection position, i.e., the take-in angle θ. The differences may each be greater as the take-in angle θ is smaller. In this example, the take-in angle θ in the position P4 may be the smallest. Therefore, the difference t2 of the position P4 may have the maximum value. It is to be noted that the take-in angle θ in the position P1 may be the greatest, and the difference t1 of the position P1 may therefore have the minimum value.

FIG. 10 illustrates a configuration for describing a relationship between the projection region S11 and an enlargement magnification α of the projection optical system 10A, and a light reception target region S12 and the reduction magnification β of the detection optical system 10B. As illustrated, the projection region S11 on the projection surface 110 may have a size (α×d1) corresponding to a-time enlargement of the diagonal size d1 of the light valve 12 by the projection lens 16.

The light reception target region S12 of the imaging device 13 may be influenced by the foregoing difference between the reflection point (the actual application point) and the virtual light emission point. For this reason, in order to allow for detection in the entire projection region S11 having the size of (α×d1), it may be ideal to set the size of the light reception target region S12 to be greater than the size (α×d1) of the projection region, taking into consideration the foregoing differences. In other words, the foregoing conditional expression (1) may be preferably satisfied. It is to be noted that the enlargement magnification a is greater than 1 as with the reduction magnification β.

(Optimization of Image Circle)

In general, an "image circle" refers to a circular range in which light that has passed through a lens is focused. In a projection system such as a projector, the image circle is so designed that an effective region of a light valve is secured in a position in which the light valve is disposed. In other words, the projection system is so designed as to secure, in a projection lens, a region through which light beams outputted from the effective region of the light valve pass. In contrast, in a case of an imaging system such as a camera, the image circle is so designed as to secure, in an imaging lens, a region through which light beams entering an effective region of the imaging device pass. In the present embodiment, the single projection lens 16 may perform both image projection and take-in of the detection light (the near-infrared light). It may be therefore preferable to so set the image circle (an image circle C1) as to secure light beams that pass through a part having the highest image height.

FIG. 11 illustrates a relationship between the image circle C1 and each of a planar shape (a rectangular shape A1) corresponding to the effective region of the light valve 12 and a planar shape (a rectangular shape A2) corresponding to the effective region of the imaging device 13. It is to be noted that FIG. 12 enlarges part of FIG. 11. Further, in more detail, the rectangular shapes A1 and A2 may correspond to planar shapes in a position substantially corresponding to the focal length of the projection lens. For a ultra-short throw type as with the present embodiment, the image circle C1 may be so designed as to secure a region through which light beams having an image height that is greatly shifted (offset) in one direction (in an Y-direction in FIG. 11, in the present example) pass. In contrast, for a projector performing only image projection, an image circle (an image circle C100) is so designed as to circumscribe the rectangular shape A1 of the light valve 12 at part of vertices of the rectangular shape A1. Specifically, the image circle C100 is so designed as to be in contact with a pair of vertices A11 and A12 that share one of longer sides of the rectangular shape A1. One reason for so designing the image circle C100 that the image circle C100 circumscribes the rectangular shape A1 is that a radius of the image circle may be preferably as small as possible in terms of maintaining characteristics and cost, taking into consideration the extremely large radius of the image circle and the large size of the projection lens.

However, in a case where the projection optical system 10A and the detection optical system 10B share the projection lens 16 as in the present embodiment, a difference (an elongated amount) may be present between the reflection point and the virtual light emission point. It may be therefore preferable to design the image circle C1 taking into consideration the foregoing matter, i.e., taking into consideration the rectangular shape A2 of the imaging device 13.

Specifically, the image circle C1 may be so designed that the image circle C1 is not in contact with the rectangular shape A1 and encompasses the rectangular shape A1. In other words, the image circle C1 may be so designed as to have a radius that is greater than a radius of a circle (the image circle C100) in contact with the vertices A11 and A12 of the rectangular shape A1 and is equal to or smaller than a radius of a circle in contact with a pair of vertices A21 and A22 sharing one of longer sides of the rectangular shape A2 of the imaging device 13. The rectangular shape A2 of the imaging device 13 may have a central position that is substantially the same as a central position of the rectangular shape A1, and be greater in size than the rectangular shape A1. Specifically, the rectangular shape A2 may include the rectangular shape A1 and a cover region A2 a that is provided in consideration of the foregoing difference. Further, it may be more preferable that the radius of the image circle C1 be equal to the radius of the circle in contact with the vertices A21 and A22 of the rectangular shape A2 as illustrated in FIG. 11. It is to be noted that the radius of the image circle C1 is not limited to that completely the same as the radius of the circle in contact with the vertices A21 and A22. Specifically, an error derived from processing of a lens, an error derived from a lens shift caused upon attaching the lens, or an error derived from any other situation may be acceptable, for example. Further, the image circle C1 may be so designed to be slightly greater in size taking into consideration such errors in advance.

Detailed conditions of the image circle C1 are further described. Referring to FIG. 13, a width "t" of the cover region A2 a provided in consideration of the foregoing difference may be expressed by the height "h" of the detection light plane 110A and the take-in angle θ (t=h/tan θ). Accordingly, the radius R1 of the image circle C1 may preferably satisfy the following conditional expression (2) in order to cause the imaging device 13 to receive the near-infrared light La1 to be taken in from the reflection point Pa (the virtual light emission point Pb) corresponding to a position of an end of the rectangular shape A1 (the projection region S11).

$$R1 \geq R0 + h/\alpha \times \tan \theta_{min} \quad (2)$$

where R0 is the radius of the circle in contact with the vertices A11 and A12 of the rectangular shape A1 of the light valve 12 (the radius of the image circle 100), α is the projection magnification (a ratio between the projection size and the effective region size of the light valve) referring to FIG. 10, "h" is the height of the detection light plane 110A from the projection surface 110, and $\theta_{min}$ is a minimum value of an angle (a take-in angle) θ formed by the projection surface 110 and the near-infrared light La1 entering the detection optical system 10B.

Moreover, it may be preferable that the following conditional expression (3) be further satisfied. By satisfying both of the conditional expressions (2) and (3), it is possible to so design the image circle C1 that the image circle C1 includes an optical path necessary for the effective region of the light valve 12 and includes an optical path necessary and sufficient for the imaging device 13 disposed coaxially with the light valve 12.

$$\beta \times d2 \geq d1 + 2h/\alpha \times \tan \theta_{min} \quad (3)$$

The signal processor 17 may detect, for example, a position of a characteristic point of the indicator (an object) 71 such as a human finger and a pointer, for example, in association with coordinates in the projection region S11 on the projection surface 110, on the basis of the imaging signal from the imaging device 13. Examples of the characteristic point may include a shape of a tip of a human finger, a center of gravity of the finger, and center of gravity of a hand.

[Workings and Effects]

Referring to FIG. 14, the projection display unit 1 may project, with the projection lens 16, image information V1 provided on the light valve 12 onto the projection surface 110 to be enlarged and displayed as a projected image V2. The projection surface 110 may be a top of a table, for example. Moreover, the projection display unit 1 may also detect a position of an object on the projection surface 110 by means of the imaging signal D0 obtained from the imaging device 13. Examples of the position of the object may include a position Pt1 of the characteristic point of the indicator (an object) 71 such as a human finger and a pointer.

In the present embodiment, the projection lens 16 may be shared by the projection optical system 10A and the detection optical system 10B, and the imaging device 13 is disposed in the position optically conjugate to the position of the light valve 12. This allows for object detection that has a detection region (a detectable region) that is substantially the same as the projection region S11. Moreover, the foregoing optically-conjugate positional relationship makes it possible to monitor, via the projection lens 16, the position Pt1 of the characteristic point of the indicator 71 on the projection surface 110 to be overlapped with the projected image V2. Moreover, for example, it is possible to perform a pointing operation on the projected image V2 by performing image process on a shape of the indicator 71 by the signal processor 17 to detect the coordinates of the position Pt1 of the characteristic point of the indicator 71. In this case, any coordinate position in the projection region S11 may correspond to a coordinate position in the detection region on a one-to-one basis. Accordingly, a coordinate of the detection position Pt2 for the imaging device 13 may correspond to a coordinate of the position Pt1 of the characteristic point of the indicator 71. In other words, it is possible to detect an object associating the position in the projection region S11 and the position in the detection region with each other without performing a complicated signal process such as calibration. It is to be noted that the number of the indicator 71 may be two or more. For example, coordinates of tips of fingers of both hands may be detectable. By using the position of the characteristic point of the indicator 71 detected in such a manner, it is possible to perform an intuitive operation as if a touch panel is embedded in the projected image V2 of the projector.

Moreover, by satisfying the foregoing conditional expression (1), it is possible to reduce the influence of the difference between the reflection point and the virtual light emission point, allowing for provision of the detection region that covers substantially the entire projection region S11, upon detection of the near-infrared light using the detection light plane 110A.

Moreover, it may be preferable that the image circle C1 be greater than the radius of the circle designed on the basis of the rectangular shape A1 of the light valve 12 as a reference (the radius of the image circle C100), as illustrated in FIG. 11. In other words, it may be preferable that the image circle C1 be not in contact with the rectangular shape A1 and include therein the rectangular shape A1. Moreover, it may be preferable that the image circle C1 include therein the rectangular shape A2 of the imaging device 13. For example, the image circle C100 that is designed on the basis of the rectangular shape A1 of the light valve 12 as a reference as illustrated in FIG. 15A may allow presence of a region (a shaded part 120 in FIG. 15B) that is not able to cover part of light, which is to be received, entering the rectangular shape A2 of the imaging device 13. In other words, object detection may not be performable in part of the projection region S11. In contrast, designing of the image circle C1 as in the present embodiment allows for object detection also in a local region such as a corner of the projection region S11.

According to the present embodiment as described above, it is possible to achieve object detection without performing complicated signal process by providing the imaging device 13 in a position that is optically conjugate to the position of the light valve 12 and allowing the imaging device 13 to receive, via the projection lens 16 and the polarization separation device 15, the light based on the near-infrared light applied along the plane in the vicinity of the projection surface 110. Moreover, it is possible to achieve object detection in substantially the entire projection region S11 by satisfying the conditional expression (1). As a result, it is possible to achieve object detection with a simple configuration and to detect an object in the entire projection region.

The disclosure is not limited to the description of the foregoing embodiments and is modifiable in a variety of ways. For example, the foregoing embodiment is described referring to an example case where the light valve 12 and the imaging device 13 have aspect ratios substantially the same as each other. However, the light valve 12 and the imaging device 13 may not necessarily have the same aspect ratio. Specifically, the light valve 12 and the imaging device 13 may differ in planar shape of the effective region as long as each of the diagonal sizes of the light valve 12 and the imaging device 13 satisfies the foregoing predetermined conditional expression.

Moreover, in the foregoing embodiment, the reflective liquid crystal device is used as the light valve of the disclosure. However, the light valve of the disclosure is not limited to the reflective liquid crystal device and may be another light valve. For example, a digital mirror device (DMD) may be used as the light valve. In this case, the light valve may be of a mirror type that does not utilize polarization characteristics of light. Therefore, a polarization optical system is not used in general. However, an optical system including a polarization separation device such as a polarizing beam splitter in a light path is allowed to be provided as with the foregoing embodiment to achieve image display using the DMD.

Moreover, the foregoing embodiment is described referring to the ultra-short throw type as one example of the projection display unit of the disclosure. However, the projection display unit of the disclosure is not necessarily limited thereto. The projection display unit of the disclosure may have any configuration in which the projection optical system and the detection optical system share the projection lens and the imaging device is disposed in the position that is optically conjugate to the position of the light valve. Such configuration may involve the difference between the reflection point and the virtual light emission point for the detection light reflected by a surface of an object. Hence, the foregoing optical design taking into consideration the foregoing difference is effective. However, this effect may be especially effective for the ultra-short throw type. It is to be noted that the effects described in the foregoing embodiment, etc. are mere examples. Any other effect may be provided, and any other effect may be further included.

For example, the disclosure may achieve the following configurations.

[1]

A projection display unit including:

a projection optical system including an illuminator, a projection lens, and a light valve that modulates illumination light supplied from the illuminator on a basis of an image signal, and outputs the modulated illumination light toward the projection lens;

a polarization separation device disposed between the light valve and the projection lens, the polarization separation device separating entering light into a first polarized component and a second polarized component, and outputting the first polarized component and the second polarized component in respective directions that are different from each other; and a detection optical system including an imaging device, the imaging device being disposed in a position that is optically conjugate to a position of the light valve, and receiving, via the projection lens and the polarization separation device, light based on invisible light applied along a plane in vicinity of the projection surface, wherein the following conditional expression is satisfied, $$d1 < \beta \times d2 \quad (1)$$

where d1 is a diagonal size of the light valve, d2 is a diagonal size of the imaging device, and β is an optical magnification, of the detection optical system, β being greater than 1 when the detection optical system is a reduction optical system, being smaller than 1 when the detection optical system is an enlargement optical system, and being equal to 1 when the detection optical system is an equal magnification optical system.

[2]

The projection display unit according to [1], wherein, in a position substantially corresponding to a focal length of the projection lens, a planar shape corresponding to an effective region of the light valve is a first rectangular shape, and an image circle of the projection lens is not in contact with the first rectangular shape and encompasses the first rectangular shape.

[3]

The projection display unit according to [2], wherein, in the position substantially corresponding to the focal length of the projection lens or a position that is optically conjugate to the position substantially corresponding to the focal length of the projection lens, a planar shape corresponding to an effective region of the imaging device is a second rectangular shape, the second rectangular shape having a central position that is substantially same as a central position of the first rectangular shape and being greater in size than the first rectangular shape, and the image circle of the projection lens encompasses the second rectangular shape.

[4]

The projection display unit according to [3], wherein the imaging device receives part of light, out of the invisible light, that is reflected by an object, and the image circle has a radius that satisfies the following conditional expression, $$R1 \geq R0 + h/\alpha \times \tan \theta_{min} \quad (2)$$

where R1 is the radius of the image circle of the projection lens, R0 is a radius of a circle that is in contact with a pair of vertices of the effective region of the light valve, "h" is a height, from the projection surface, of the plane along which the invisible light is to be applied, α is a projection magnification, and $\theta_{min}$ is a minimum value of an angle formed by the projection surface and the part of the reflected light entering the detection optical system.

[5]

The projection display unit according to [4], wherein the following expression (3): $\beta \times d2 \geq d1 + 2h/\alpha \times \tan \theta_{min}$ is further satisfied.

[6]

The projection display unit according to any one of [1] to [5], wherein the detection optical system includes a reduction optical system between the polarization separation device and the imaging device, the reduction optical system having one or more relay lens groups.

[7]

The projection display unit according to any one of [1] to [6], wherein the detection optical system includes a visible light cut filter between the polarization separation device and the imaging device, the visible light cut filter reducing a visible light component.

[8]

The projection display unit according to any one of [1] to [7], wherein the detection optical system includes a polarizer between the polarization separation device and the imaging device, the polarizer selectively removing one of the first polarized component and the second polarized component.

[9]

The projection display unit according to any one of [1] to [8], further including a signal processor that detects a position, on the projection surface, of an object on a basis of an imaging signal obtained from the imaging device.

[10]

The projection display unit according to any one of [1] to [9], wherein the projection lens is a short throw lens.

[11]

The projection display unit according to [10], further including a light source provided on a casing, the light source outputting the invisible light.

[12]

The projection display unit according to any one of [1] to [11], wherein the invisible light is near-infrared light.

[13]

The projection display unit according to any one of [1] to [12], wherein the polarization separation device is a polarizing beam splitter.

[14]

The projection display unit according to [13], wherein the light valve is a reflective liquid crystal display device.

[15]

The projection display unit according to [14], wherein the polarization separation device has a first surface, a second surface, a third surface, and a fourth surface that each serve as a light entering surface or a light output surface, and the polarization separation device outputs, from the second surface, the first polarized component out of light that has entered the polarization separation device from the first surface, outputs, from the third surface, the second polarized component out of the light that has entered the polarization separation device from the first surface, outputs, from the fourth surface, the second polarized component out of light that has entered the polarization separation device from the second surface, and outputs, from the third surface, the first polarized component out of light that has entered the polarization separation device from the fourth surface.

[16]

The projection display unit according to [15], wherein the projection optical system is configured to allow the illuminator to output the illumination light toward the first surface of the polarization separation device, the light valve to modulate the first polarized component, out of the illumination light, that has been outputted from the second surface of the polarization separation device, and output light resulting from the modulation toward the second surface of the polarization separation device, and the projection lens to project, toward the projection surface, light, out of the modulated light, that has been outputted from the fourth surface of the polarization separation device.

[17] The projection display unit according to [16], wherein
the detection optical system is configured to allow
the reduction optical system to receive object detection light via the projection lens, the fourth surface of the polarization separation device, and the third surface of the polarization separation device, and
the imaging device to receive light outputted from the reduction optical system.

This application is based upon and claims the benefit of priority of the Japanese Patent Application No. 2014-153659 filed in the Japan Patent Office on Jul. 29, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display unit comprising:
a projection optical system including
an illuminator,
a projection lens, and
a light valve that modulates illumination light supplied from the illuminator on a basis of an image signal, and outputs the modulated illumination light toward the projection lens;
a polarization separation device disposed between the light valve and the projection lens, the polarization separation device separating entering light into a first polarized component and a second polarized component, and outputting the first polarized component and the second polarized component in respective directions that are different from each other; and
a detection optical system including an imaging device, the imaging device being disposed in a position that is optically conjugate to a position of the light valve, and receiving, via the projection lens and the polarization separation device, light based on invisible light applied along a plane in vicinity of the projection surface, wherein
the following conditional expression is satisfied, $$d1 < \beta \times d2 \quad (1)$$

where d1 is a diagonal size of the light valve, d2 is a diagonal size of the imaging device, and $\beta$ is an optical magnification, of the detection optical system, $\beta$ being greater than 1 when the detection optical system is a reduction optical system, being smaller than 1 when the detection optical system is an enlargement optical system, and being equal to 1 when the detection optical system is an equal magnification optical system.

2. The projection display unit according to claim 1, wherein,
in a position substantially corresponding to a focal length of the projection lens,
a planar shape corresponding to an effective region of the light valve is a first rectangular shape, and
an image circle of the projection lens is not in contact with the first rectangular shape and encompasses the first rectangular shape.

3. The projection display unit according to claim 2, wherein,
in the position substantially corresponding to the focal length of the projection lens or a position that is optically conjugate to the position substantially corresponding to the focal length of the projection lens,
a planar shape corresponding to an effective region of the imaging device is a second rectangular shape, the second rectangular shape having a central position that is substantially same as a central position of the first rectangular shape and being greater in size than the first rectangular shape, and
the image circle of the projection lens encompasses the second rectangular shape.

4. The projection display unit according to claim 3, wherein
the imaging device receives part of light, out of the invisible light, that is reflected by an object, and
the image circle has a radius that satisfies the following conditional expression, $$R1 \geq R0 + h/\alpha \times \tan \theta_{min} \quad (2)$$

where R1 is the radius of the image circle of the projection lens, R0 is a radius of a circle that is in contact with a pair of vertices of the effective region of the light valve, "h" is a height, from the projection surface, of the plane along which the invisible light is to be applied, $\alpha$ is a projection magnification, and $\theta_{min}$ is a minimum value of an angle formed by the projection surface and the part of the reflected light entering the detection optical system.

5. The projection display unit according to claim 4, wherein the following expression (3): $\beta \times d2 \geq d1 + 2h/\alpha \times \tan \theta_{min}$ is further satisfied.

6. The projection display unit according to claim 1, wherein the detection optical system includes a reduction optical system between the polarization separation device and the imaging device, the reduction optical system having one or more relay lens groups.

7. The projection display unit according to claim 1, wherein the detection optical system includes a visible light cut filter between the polarization separation device and the imaging device, the visible light cut filter reducing a visible light component.

8. The projection display unit according to claim 1, wherein the detection optical system includes a polarizer between the polarization separation device and the imaging device, the polarizer selectively removing one of the first polarized component and the second polarized component.

9. The projection display unit according to claim 1, further comprising a signal processor that detects a position, on the projection surface, of an object on a basis of an imaging signal obtained from the imaging device.

10. The projection display unit according to claim 1, wherein the projection lens is a short throw lens.

11. The projection display unit according to claim 10, further comprising a light source provided on a casing, the light source outputting the invisible light.

12. The projection display unit according to claim 1, wherein the invisible light is near-infrared light.

13. The projection display unit according to claim 1, wherein the polarization separation device is a polarizing beam splitter.

14. The projection display unit according to claim 13, wherein the light valve is a reflective liquid crystal display device.

15. The projection display unit according to claim 14, wherein
the polarization separation device has a first surface, a second surface, a third surface, and a fourth surface that each serve as a light entering surface or a light output surface, and the polarization separation device outputs, from the second surface, the first polarized component out of light that has entered the polarization separation device from the first surface, outputs, from the third surface, the second polarized component out of the light that has entered the polarization separation device from the first surface, outputs, from the fourth surface, the second polarized component out of light that has entered the polarization separation device from the second surface, and outputs, from the third surface, the first polarized component out of light that has entered the polarization separation device from the fourth surface.

16. The projection display unit according to claim 15, wherein the projection optical system is configured to allow the illuminator to output the illumination light toward the first surface of the polarization separation device, the light valve to modulate the first polarized component, out of the illumination light, that has been outputted from the second surface of the polarization separation device, and output light resulting from the modulation toward the second surface of the polarization separation device, and the projection lens to project, toward the projection surface, light, out of the modulated light, that has been outputted from the fourth surface of the polarization separation device.

17. The projection display unit according to claim 16, wherein the detection optical system is configured to allow the reduction optical system to receive object detection light via the projection lens, the fourth surface of the polarization separation device, and the third surface of the polarization separation device, and the imaging device to receive light outputted from the reduction optical system.

* * * * *